United States Patent
Ohlrogge et al.

(10) Patent No.: US 6,485,545 B1
(45) Date of Patent: Nov. 26, 2002

(54) ARRANGEMENT FOR REMOVING WATER VAPOR FROM PRESSURIZED GASES OR GAS MIXTURES

(75) Inventors: Klaus Ohlrogge, Geesthacht (DE); Volker Nitsche, Hamburg (DE); Jan Wind, Lauenburg (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 09/494,485

(22) Filed: Jan. 31, 2000

Related U.S. Application Data

(63) Continuation-in-part of application No. PCT/DE98/01891, filed on Jul. 9, 1998.

(30) Foreign Application Priority Data

Sep. 6, 1997 (DE) .......................... 197 39 144

(51) Int. Cl.[7] .......................... B01D 53/22; B01D 53/26
(52) U.S. Cl. .......................... 96/4; 95/39; 95/52; 96/13
(58) Field of Search .......................... 95/39, 52; 96/4, 96/10, 12, 13

(56) References Cited

U.S. PATENT DOCUMENTS

| | | | | |
|---|---|---|---|---|
| 3,303,105 A | * | 2/1967 | Konikoff et al. ............. | 96/4 X |
| 3,735,559 A | * | 5/1973 | Salemme ...................... | 95/52 |
| 4,331,456 A | * | 5/1982 | Schwartz et al. .......... | 95/101 X |
| 4,466,202 A | * | 8/1984 | Merten ........................ | 96/4 X |
| 4,497,640 A | * | 2/1985 | Fournie et al. ............. | 95/52 X |
| 4,994,094 A | * | 2/1991 | Behling et al. ................ | 95/39 |
| 5,002,590 A | * | 3/1991 | Friesen et al. ................. | 95/52 |
| RE33,678 E | * | 9/1991 | Campbell et al. ........... | 95/52 X |
| 5,084,073 A | * | 1/1992 | Prasad ............................ | 95/52 |
| 5,129,921 A | * | 7/1992 | Baker et al. ................. | 96/4 X |
| 5,194,074 A | * | 3/1993 | Hauk ........................ | 96/10 X |
| 5,259,869 A | * | 11/1993 | Auvil et al. ................... | 95/52 |
| 5,641,337 A | * | 6/1997 | Arrowsmith et al. .......... | 95/39 |

FOREIGN PATENT DOCUMENTS

| | | | | |
|---|---|---|---|---|
| DE | 44 32 482 | | 3/1996 | |
| EP | 0 547 387 | | 6/1993 | |
| EP | 0 702 068 | | 3/1996 | |
| JP | 62-241527 | * | 10/1987 | ............ 95/52 |
| JP | 01-143625 | * | 6/1989 | ............ 95/52 |
| JP | 01-176425 | * | 7/1989 | ............ 95/52 |
| JP | 04-122414 | * | 4/1992 | ............ 95/52 |
| JP | 05-177111 | * | 7/1993 | ............ 95/52 |

* cited by examiner

*Primary Examiner*—Robert H. Spitzer
(74) *Attorney, Agent, or Firm*—Klaus J. Bach

(57) ABSTRACT

In an arrangement for removing water vapor from pressurized gases or gas mixtures, particularly from air, a membrane separating apparatus is provided wherein the gas-vapor stream is separated into a vapor-enriched permeate stream and a vapor-depleted retentate stream and the vapor enriched permeate stream is conducted to a vacuum pumping device for generating at the permeate side of the membrane separating apparatus a vacuum providing for a pre-determined trans-membrane pressure ratio.

13 Claims, 2 Drawing Sheets

ARRANGEMENT FOR REMOVING WATER VAPOR FROM PRESSURIZED GASES OR GAS MIXTURES

This is a continuation-in-part application of pending international application PCT/DE98/01891 filed Jul. 9, 1998 and claiming the priority of German application 197 39 144.3 filed Sep. 6, 1997.

BACKGROUND OF THE INVENTION

The invention resides in an arrangement for removing water vapor from pressurized gases or gas mixtures, particularly air, wherein the gas vapor mixture is supplied to a separating device in which it is divided into a vapor-depleted and a vapor-enriched gas stream.

The removal of water vapor from gas streams is needed in many technical areas. If for example, compressed air is used as a power supply, it is absolutely necessary to remove the water vapor from the compressed air. The most important areas of use reside in the utilization of the compressed air for operating compressed air tools, as control air for the control of processes, as instrument operating air and for the operation of pneumatic transport equipment for moving particulate bulk material.

Since, at the discharge of a compressor, the compressed air is always saturated with water vapor, even a minimal temperature reduction results in water vapor condensation. Condensation or the formation of ice in a compressed air conduit arrangement would detrimentally affect the compressed air consumers mentioned above or would even cause them to become inoperative. For this reason, the water vapor content of the compressed air stream leaving the compressor must be reduced by subjecting the compressed air leaving the compressor to a suitable drying process. The pressure dew point to be selected and, consequently, the separation efforts depend on the specific requirements of the respective compressed air consumers.

The vapor removal from the compressed air has been called in the past the drying of the compressed air. For this procedure, generally refrigeration and adsorption processes have been employed. In 90% of all applications, refrigeration procedures have been used for drying the compressed air. In this drying process, the air leaving the compressor at a high temperature is cooled in an air/air heat exchanger in a counter-current heat exchange with the dried air. In this heat exchange step, a substantial amount of water vapor is already condensed. Subsequently, the compressed air is further cooled until the desired pressurized air dew point has been reached in a refrigerant/air heat exchanger, wherein the enthalpy re-quired for the vaporization of a refrigerant is removed from the compressed air stream which is cooled thereby. The water molecules collected on the cold walls of the heat exchanger flow to a condensate collector from which they are automatically discharged from time to time.

Drying by adsorption is also a purely physical process, wherein moist compressed air is conducted through a container filled with suitable adsorbents. The strong interaction of the water vapor molecules with the solid porous adsorbents, which have a large surface area, provides for a selective separation of the water vapor. Suitable adsorbents for the drying of compressed air are, for example, siliceous gel, activated alumina or zeolite. The adsorption process is in principle a discontinuous process since the adsorbents have only a given capacity for the adsorbed water vapor and, consequently, must be regenerated periodically. As a result, at least two adsorbers are required which are alternatively operated and regenerated. The desorption of the water molecules from the charged adsorber beds is accomplished either by cold or warm regeneration.

Although the above-mentioned refrigeration process is basically the most direct way to achieve a particular dew point for a gas vapor mixture, this method of drying air streams has substantial disadvantages because of energy considerations. This is made apparent by an example: It is assumed that an air stream discharged from a compressor must first be pre-cooled in any case, no matter which drying method is used to remove the moisture. It is assumed that a pressurized air stream at 35° C. and 8 bar absolute pressure, which is saturated with water vapor, is being dried. Under this thermodynamic condition of the compressed air, the volume part of the condensable component water vapor upon entering the refrigerant/air heat exchanger is only 0.7%. This means, however, that 99.3% of the total volume that is the volume of the compressed air needs to be cooled down to the required low temperature without deriving any advantage therefrom for this main part of the pressurized air stream. Since the relative humidity should always be kept below 60% in order to limit corrosion, the cold gas-vapor mixture from which water has been condensed must again be heated. Basically, refrigeration dryers are suitable only for achieving pressure dew points of minimally +2° C. At lower refrigerant temperatures, ice will be formed on the heat exchange surfaces at the pressurized air side. Since ice has a relatively low heat transfer coefficient the insulating effects of the ice layer would substantially reduce the heat transfer capacity. The desired pressure dew point at the air side of the heat exchanger could then no longer be reached even with only relatively thin ice layers. In addition, the pressure losses in the heat exchanger would increase because the passages would be restricted. Furthermore, the condensate formed by this principle on the cold surfaces of the refrigeration air dryers leads frequently to problems. Often the condensate discharge line becomes inoperative and must be serviced. The condensate discharge lines may include magnetic valves, which form relatively high flow restrictions resulting in pressure losses during condensate removal. In summary, it can be said that the installation of large refrigeration dryers is quite expensive and requires frequent and expensive servicing. In addition, the operation of refrigeration dryers is noisy so that means for reducing the noise emissions are required.

The adsorption methods for the removal of moisture from pressurized air referred to earlier are employed if pressure dew points of less than 0° C. are required since the refrigeration dryers cannot be used under those conditions as pointed out earlier. The main disadvantages of an adsorption dryer reside in the basically discontinuous operation. Cold- as well as warm-regenerating adsorbers require a flushing air stream for the removal of the moisture adsorbed earlier. Since the flushing air stream must be sufficiently dry, a certain amount of the dried pressurized airflow is used for that purpose. This partial airflow which has been dried before in an expensive way is therefore lost for the compressed air consumer. Depending on the application and the regeneration mode this lost airflow can be up to 15% of the dried pressurized air stream. While the adsorption takes place at the pressure generated by the compressor, the pressure of the air must be reduced to atmospheric pressure for desorption. With the cyclic pressure change the adsorption structure is highly stressed. As a result, the equilibrium charge, that is the adsorption capacity of the adsorption structure, drops over time. With activated alumina for example the capacity drops by 30 to 40% at 150° C. after 500 cycles. In a way, the adsorption is a self-inhibiting process since, with the adsorption of the water molecules, adsorption heat becomes free which results in a temperature increase in the adsorption bed whereby the adsorption equilibrium moves in a direction resulting in a substantially reduced adsorption capacity.

It is therefore the object of the present invention to provide an arrangement for the removal of water vapor from pressurized gases or gas mixture of the type referred to earlier wherein the disadvantages described above are avoided. It should facilitate the removal of water vapor from small, medium as well as large gas and gas mixture streams in a simple manner and without high expenses. The arrangement should be simple in design and therefore inexpensive so that it can be provided and operated at relatively low costs. The servicing and operating requirements should be substantially lower than necessary with present drying arrangements.

SUMMARY OF THE INVENTION

In an arrangement for removing water vapor from pressurized gases or gas mixtures, particularly from air, a membrane separating apparatus is provided wherein the gas-vapor stream is separated into a vapor-enriched permeate stream and a vapor-depleted retentate stream. The vapor enriched permeate stream is conducted to a vacuum pumping device for generating, at the permeate side of the membrane separating apparatus, a vacuum providing for a predetermined trans-membrane pressure ratio.

The advantage of the arrangement according to the invention resides essentially in the fact that the arrangement is simple in design, is highly efficient and is inexpensive in its manufacture and its operation. All disadvantages of the known arrangements and methods for the removal of water vapor from pressurized gases and gas mixtures are avoided by the arrangement according to the invention: Neither ice will be formed on heat exchanger surfaces (as in the known refrigeration methods), nor is the operation discontinuous (as with the adsorption processes). The components used in accordance with the invention are well known as such and employed in large numbers in osmotic processes. As a result, the arrangement according to the invention can be provided inexpensively and also the maintenance and servicing costs are reasonably low.

In an advantageous embodiment of the invention the membrane separating structure can be operated in a cross-current mode or in a countercurrent mode without the need for external flushing gas.

Preferably, the membranes used in the membrane separating apparatus are membranes formed on the basis of cellulose ether as they are disclosed for example in DE 196 03 420.5 (Composite membrane consisting particularly of a micro-porous carrier membrane). This membrane has a high permeability for water vapor $L_w$ up to 50 m$^3$(i.N.)/m$^2$ h bar).

Preferably, the membranes used in the membrane separating apparatus are so selected that they have a high selectivity a ($\alpha$=the ratio water vapor permeability to carrier gas permeability). With certain measures during the manufacture of these membranes their selectivity $\alpha$ can be adjusted in a wide range for a constant water flow. This membrane has no selectivity between the carrier gas parts for example oxygen and nitrogen.

Preferably, the selectivity $\alpha$ is so selected that it is in the range of 1000 to 10000.

However, the use of a highly selective membrane is generally reasonable only if, at the same time, a correspondingly high pressure ratio is available. In order to achieve an adaptation of the pressure ratio to a high membrane selectivity, the pumping device at the permeate side is a liquid ring vacuum pump, which is operated with water forming the liquid ring. With the water vapor concentration in the permeate increasing with the selectivity and the higher pressure ratio, substantially higher suction volumes can be achieved with the liquid ring vacuum pump. The reason herefor is that water vapor contained in the permeate is condensed in the liquid ring on its way from the suction to the pressure side of the pump. This results in a density change providing for a certain free volume.

In an advantageous embodiment of the arrangement, the pumping device is formed by a steam-operated ejector, particularly if low permeate pressures are to be established (<40 which is a combination of a liquid ring vacuum pump and a steam operated ejector pump.

In another advantageous embodiment, a high trans-membrane pressure ratio $\phi$ ($\phi$=the ratio of the system pressure at the high and the low pressure sides of the membrane, simply defined as the ratio feed pressure to permeate pressure) as required for the separation of gas mixtures by pore-free membranes is generally given with the use in a pressurized air drying process since the feed pressure is provided by a compressor. If the permeate stream is discharged against atmospheric pressure, the pressure ratio would always be smaller than 10 and the required pressure dew point could not be achieved. The use of a highly selective membrane would only make sense if, at the same time, a high pressure ratio is available—as mentioned earlier. This can be achieved by providing at the permeate side a vacuum of, for example, 50 mbar. With a compression pressure of 8 bar, the pressure ratio of $\phi$=8 can then be increased by a factor of 20 to $\phi$=160.

In another advantageous embodiment, a water separator is arranged downstream of the pumping device and the operating liquid leaving the water separator is advantageously used as coolant. Preferably, the gas vapor mixture to be separated is conducted, before it is admitted to the membrane separating apparatus, through a cooling device, which is cooled by the operating liquid of the water separator.

In still another advantageous embodiment of the invention, the water leaving the cooling device is used as operating liquid for the liquid ring vacuum pump used as pumping device. Preferably, the water leaving the cooling device is conducted through a cooler to be cooled before it is used as the operating fluid for the water ring vacuum pump. The water leaving the water separator, that is, the cooling liquid discharged therefrom is subjected only to a slight temperature increase because the water ring vacuum pump closely realizes the principle of isothermal compression so that, as described above, it can still be used as coolant.

A particular embodiment with two modifications of the invention will be described below on the basis of the accompanying drawings.

DESCRIPTION OF PREFERRED EMBODIMENT

Figure 1:
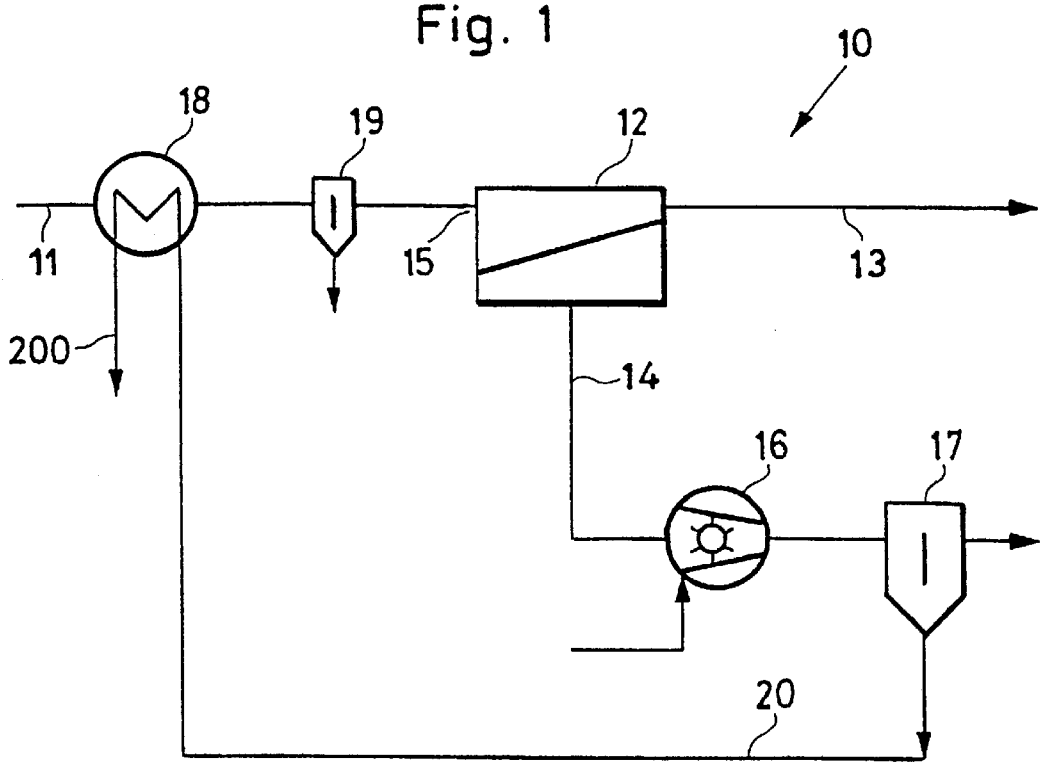
FIG. 1 is a block diagram of the basic arrangement according to the invention.

The arrangement as shown in FIG. 1 represents the basic arrangement for the removal of water vapor from pressurized gases or gas mixtures. The arrangement 10 and its operation is described with reference to FIG. 1.

The pressurized gas-vapor mixture 11, also called the feed stream, is supplied to a cooling device 18, wherein it is cooled in a predetermined manner. From the cooling device 18, the gas-vapor mixture 11, still under pressure, is conducted to a separator 19 in which foreign matter contained in the gas vapor mixture such as oil are separated therefrom. Then the pressurized gas vapor mixture 11 reaches the inlet 15 of a membrane separating apparatus 12. In the membrane separating apparatus 12, the gas vapor mixture 11 is separated into a vapor-enriched gas stream 14 (permeate) and a vapor-depleted gas stream 13 (retentate). The vapor-depleted gas stream 13 represents a partial stream from which the water vapor has been removed, for example "dried" compressed air.

The required vacuum at the permeate side of the membrane apparatus 12 is generated by a pumping device 16, which is connected to the permeate-side outlet of the membrane apparatus 12. The pumping device 16 may be, for example, a liquid-ring vacuum pump or a steam ejector. However, it is also possible to provide a pumping device 16, which consists of a combination of a steam ejector and a liquid ring vacuum pump. The pumping device is shown herein only as being representative for any suitable pump, which can be used in connection with the arrangement of the invention and fulfills the desired purpose. As mentioned already, the vapor-enriched gas stream 14 leaves the pumping device 16 and is conducted to a water separator 17. The vapor-enriched gas stream 14 leaves the water separator 17 with reduced water content and can be discharged into the environment. The discharge into the environment poses no problems since the water vapor-gas stream is neither a valuable product nor is it an environmentally unsafe product.

However, the arrangement 10 is basically also suitable for drying natural gas. The permeate, that is the vapor enriched gas stream 14 may, in that case, include noticeable amounts of hydrocarbons, mainly methane. For ecological and economical reasons, the vapor enriched gas stream must then be further treated. Some additional processing step would then be required which however will not be described herein.

The water 20 deposited in the water separator 17 can be supplied as coolant to the cooling device 18, where it is in heat exchange relation with the incoming gas vapor mixture 11 for cooling the gas vapor mixture. It leaves the cooling device 18 as water 200.

Figure 2:
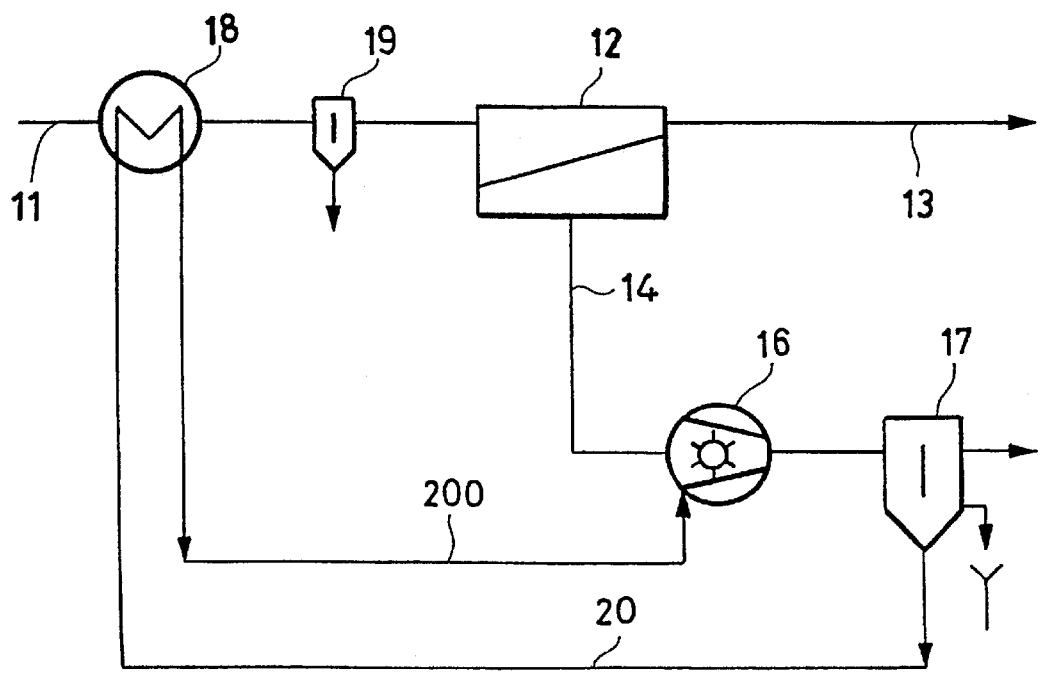
FIG. 2 shows the arrangement according to FIG. 1, wherein however the operating liquid of a water separator is used as cooling liquid for a liquid ring vacuum pump together with some fresh operating liquid.

The arrangement according to FIG. 2 differs from the arrangement of FIG. 1 only in that the water 200 leaving the cooling device 18 is re-circulated and is supplied to the pumping device 16 which, in this case, is a liquid ring pump, wherein the water 200 is utilized as the ring liquid. In this embodiment, the water removed from the process of the arrangement 10 is utilized in a circuit for cooling purposes and also as the operating liquid for the liquid ring vacuum pump. In order to prevent increasing warm-up of the operating liquid of the pumping device 16, part of the operating liquid is discharged after the water separator 17. A corresponding amount of fresh/cold liquid is added to the circuit at the inlet of the pumping device 16.

Figure 3:
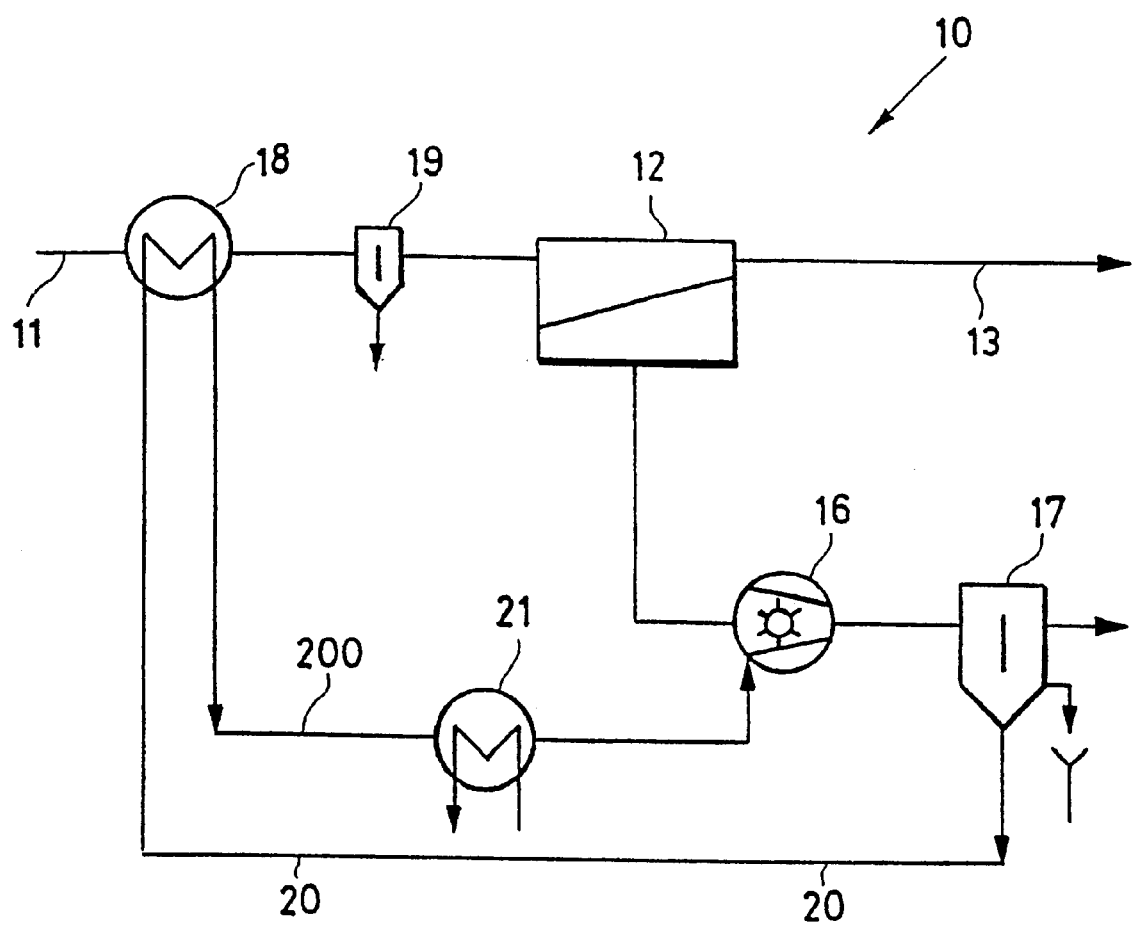
FIG. 3 shows an arrangement as shown in FIG. 2, wherein the water ring liquid supplied to the liquid ring vacuum pump is first conducted through a cooling device.

The arrangement 10 according to FIG. 3 differs from the arrangement 10 of FIG. 2 only in that the water 200 from the cooling device 18 is conducted through a cooler 21 before it is supplied to the liquid ring vacuum pump, which is used as the pumping device 16.

It is very important for the setup and the operation of the arrangement 10 that the appropriate membrane is chosen for the membrane separating apparatus. In this connection, the selectivity α of the membrane is especially important.

With certain measures taken during the manufacture of the membrane the selectivity α can be adjusted in a wide range with a constant water stream. The whole membrane has no selectivity between the carrier gas components oxygen and nitrogen. Under the given object of improving the separation of the permeating vapor-like smaller volume component, such as water vapor, an increase of the selectivity by a reduction of the flow volume of the low permeating main component, such as air, is disadvantageous for the dew point reduction of the gas vapor mixture 11 remaining on the high pressure side of the membrane. Achieving a certain pressure dew point requires in this case, a larger membrane surface with the use of membranes whose selectivity has been increased by a flow reduction of the less permeating component. The higher selectivity results, on the other hand, in a clearly lower stage cut Θ (Θ is the ratio of permeate volume flow to feed flow) and a higher water vapor concentration in the enriched permeate stream. The pressurized air losses are consequently reduced in spite of a larger membrane surface. The trans-membrane pressure ratio φ (φ=the ratio of the system pressures at the high and the low pressure sides of the membrane, which is defined in a simplified manner usually as the ratio of feed pressure to permeate pressure), which is necessary for the separation of gas mixtures with the aid of pore-free membranes, is generally present with the use of pressurized air drying procedures since the feed pressure, that is the pressure of the gas vapor mixture 11, is always generated by a compressor. However, if the permeate stream is discharged against atmospheric pressure, the ratio would always be smaller than 10. The required pressure dew points could not be reached in this way.

The use of a highly selective membrane makes sense only if, at the same time, there is a correspondingly high pressure ratio available. In accordance with the present invention, the pressure ratio has been adapted to the high membrane selectivity by the installation of the liquid ring vacuum pump 16 at the permeate side which is operated with water as the ring liquid. With a vacuum of for example 50 mbar at the permeate side, the pressure ratio can—based on a compression pressure of 8 bar—be increased from φ=8 to φ=160, that is, by a factor of 20. With the combination of a highly selective membrane and a high pressure ratio, which is generated by the liquid ring vacuum pump 16, the above mentioned disadvantages of high membrane surface requirements are eliminated by high membrane selectivities.

The positive effects of the cooperation of a highly selective membrane at one hand and a high pressure ratio by permeate side vacuum generation on the other hand, can be seen from the following table 1. The advantage obtained with higher selectivities in any case, that is, lower compressed air or pressurized gas losses, is multiplied by the increase of the pressure ratio. With this construction, another characteristic advantage of the proposed arrangement 10 and the drying process performed therewith is obtained. With the increased selectivity and the higher pressure ratio, the water vapor concentration in the permeate is increased and the vacuum pump 16 can achieve substantially increased suction volumes. The reason herefor resides in the fact that the water vapor contained in the permeate is condensed in the liquid ring on the way from the suction to the pressure side of the vacuum pump 16 resulting in a density change providing for a certain free volume (volume reduction). Considering the minimum gas volume for a cavitation-free operation of the vacuum pump 16, the selection of the vacuum pump 16 does not need to be based on the total permeate volume flow but only on the lower inert gas volume part of the permeate flow taking into consideration the corresponding phase equilibrium at the discharge side of the pumping device 16. In other words, with increasing water content in the permeate, the pump size needed for the respective task in the arrangement 10 becomes smaller resulting in correspondingly lower system and operating expenses.

Table 1:

The influence of the membrane selectivity and the pressure ratio generated by vacuum support on the membrane surface requirements $A_{erf}$, the air pressure loss $\Theta$ air and the water vapor concentration $Y_{Page}$, $H_2O$ in the permeate.

Permeate pressure $P_p$=0.1 (bar)

| $\alpha$ | $A_{req}$ (m$^2$) | $Y_{P,H2O}$ (Vol %) | $\theta_{tot}$ (%) | $\theta_{air}$ (%) |
|---|---|---|---|---|
| 100 | 16.00 | 12.30 | 5.03 | 4.44 |
| 500 | 46.40 | 19.44 | 3.17 | 2.57 |
| 1000 | 83.20 | 21.13 | 2.92 | 2.32 |
| 5000 | 377.60 | 22.80 | 2.70 | 2.10 |
| 10000 | 744.80 | 23.04 | 2.68 | 2.08 |

Permeate pressure $P_p$=0.05 (bar)

| $\alpha$ | $A_{req}$ (m$^2$) | $Y_{P,H2O}$ (Vol %) | $\theta_{tot}$ (%) | $\theta_{air}$ (%) |
|---|---|---|---|---|
| 100 | 12.00 | 16.11 | 3.83 | 3.24 |
| 500 | 24.00 | 31.42 | 1.96 | 1.35 |
| 1000 | 38.40 | 36.58 | 1.68 | 1.07 |
| 5000 | 144.80 | 43.28 | 1.42 | 0.81 |
| 10000 | 275.20 | 44.53 | 1.38 | 0.77 |

Permaete pressure =0.033 (bar)

| $\alpha$ | $A_{req}$ (m$^2$) | $Y_{P,H2O}$ (Vol %) | $\theta_{tot}$ (%) | $\theta_{air}$ (%) |
|---|---|---|---|---|
| 100 | 10.40 | 17.93 | 3.44 | 2.84 |
| 500 | 17.60 | 38.70 | 1.59 | 0.98 |
| 1000 | 24.80 | 46.83 | 1.31 | 0.70 |
| 5000 | 76.80 | 58.92 | 1.04 | 0.43 |
| 10000 | 138.40 | 61.51 | 1.00 | 0.39 |

Calculation basis:

Air-water vapor-mixture $P_F$8 bar $e_F$=35° C.

$Y^*_{F, H2O}$=0.7 Vol %→$Y_{F, air}$=99.3 Vol %

$G_f$=1000 m$^3$/h

Water vapor permeability $L_{H2O}$=35 m$_N^3$/ (m$^2$bar)

Aim; Retentate—dew point $e_{t, R}$=+2° C.

Explanation of Designations

| | | |
|---|---|---|
| $A_{req}$ | Required membrane surface | (m$^2$) |
| $G_F$ | Feed volume stream | (m$_N^3$/h) |
| $L_{H2O}$ | Water vapor permeability | (m$_N^3$/(m$^2$h bar)) |
| $P_F$ | Feed pressure | (bar) |
| $P_P$ | Permeate pressure | (bar) |
| $Y^*_{F,H2O}$ | Concentration of the water vapor in the feed (Saturation concentration at $P_F$ and $e_F$) | (Vol %) |
| $Y_{F,air}$ | Air concentration in the feed | (Vol %) |
| $Y_{P,H2O}$ | Water vapor concentration in the permeate | (Vol %) |
| $\alpha$ | Membrane selectivity | (-) |
| $\theta_{tot}$ | Membrane stage cut | (%) |
| $\theta_{air}$ | Air stage cut | (%) |

The use of the described arrangement 10 provides for a number of advantages over the conventional refrigeration and adsorption methods described in the introductory part of the specification. On the basis of identical drying performances, the arrangements according to the invention are clearly more compact than refrigeration drying apparatus. But they have not only a lower construction volume, they are also substantially lighter in weight (lower requirements for foundations). The arrangement according to the invention has only negligeable losses for the already compressed air since the permeate stream passing through the membrane consists, with the use of the above described highly selective membrane in connection with an appropriately high pressure ratio, to a large part of water vapor. During operation of the arrangement according to the invention, no problematic auxiliary compounds are needed as they are required for example in connection with refrigeration dryers (Freon-ozone killer). Rather, only water is used for the operation of the liquid ring vacuum pump 16 and an electric power supply. The arrangement according to the invention has no physical limits with respect to the pressure dew point to be adjusted, that is, any desired pressure dew points above and below 0° C. can be achieved. In principle, no condensate is generated in the high-pressure side drying area. The condensation of the moisture carried into the permeate occurs rather in the liquid ring vacuum pump 16 arranged at the permeate side. This also results in an improved pumping efficiency, which has a positive effect on the total operation of the arrangement according to the invention.

The high noise emissions generated by adsorption dryers (expansion during desorption) as well as by refrigeration dryers (compression of the refrigeration apparatus) are greatly reduced with the arrangement according to the invention. There is only the relatively low and easily controllable noise of the pumping device 16.

Experience with the arrangements according to the invention has shown that the arrangements are highly reliable and have relatively low maintenance expenses.

What is claimed is:

1. An arrangement for removing water vapor from pressurized gases or gas mixtures, comprising a gas-vapor seperation structure in which a gas-vapor stream is separated into a vapor-enriched permeate stream and a vapor-depleted retentate stream, said separation structure including a membrane separating apparatus having a retentate side and a permeate side and a mixture inlet, a membrane with a selectivity of $\alpha$=100 to 10,000 disposed between and separating said retentate side from said permeate side, a vapor-depleted gas outlet in communication with the retentate side of said membrane separating apparatus and a vapor-enriched gas outlet in communication with the permeate side of said membrane separating apparatus, means for supplying said pressurized gas including said vapors to said membrane separating apparatus, wherein said gas-vapor stream is separated into said vapor depleted retentate stream remaining on the retentate side of said membrane separating apparatus and said vapor-enriched permeate stream at the permeate side of said membrane separating apparatus, and a vacuum pumping device connected to said vapor-enriched gas outlet for generating a vacuum at the permeate side of said membrane separating apparatus.

2. An arrangement according to claim 1, wherein said pumping device includes means for condensing the vapors contained in said permeate stream.

3. An arrangement according to claim 2, wherein said pumping device is a liquid ring vacuum pump.

4. An arrangement according to claim 2, wherein said pumping device is a steam ejector pump.

5. An arrangement according to claim 2, wherein said pumping device is a combination of a liquid ring vacuum pump and a steam ejector pump.

6. An arrangement according to claim 1, wherein the membranes of said membrane separating apparatus are cellulose-ether based membranes.

7. An arrangement according to claim 1, wherein said pumping device is so selected as to provide for a predetermined trans-membrane pressure ratio.

8. An arrangement according to claim 1, wherein said pumping device is connected to a first water separator.

9. An arrangement according to claim 8, wherein a cooling device is arranged upstream of said membrane-separating apparatus through which said pressurized gas flow is conducted before it is admitted to said membrane separating apparatus.

10. An arrangement according to claim 9, wherein a second water separator is arranged between said cooling device and said membrane-separating apparatus.

11. An arrangement according to claim 9, wherein the water removed from said pressurized gas in said first water separator is conducted to said cooling device for cooling said pressurized gas flow.

12. An arrangement according to claim 11, wherein said pumping device is a liquid ring vacuum pump and said cooling device is connected to said liquid ring pump for supplying the cooling water leaving said cooling device as operating liquid to said liquid ring vacuum pump.

13. An arrangement according to claim 12, wherein a cooler is provided for cooling the cooling water from said cooling device before it is admitted to said liquid ring vacuum pump.

* * * * *